United States Patent Office 3,534,040
Patented Oct. 13, 1970

3,534,040
5,12-DIALKYL FLUORINDINE COMPOUNDS
James M. Straley and Raymond C. Harris, Kingsport, Tenn., assignors to Eastman Kodak Company, Rochester, N.Y., a corporation of New Jersey
No Drawing. Filed Oct. 20, 1965, Ser. No. 499,078
The portion of the term of the patent subsequent to July 2, 1985, has been disclaimed
Int. Cl. C07d 51/80
U.S. Cl. 260—267                    19 Claims

ABSTRACT OF THE DISCLOSURE

Dialkylfluorindine compounds are useful as dyes for polyacrylonitrile textile materials.

---

This invention relates to compounds of the fluorindine series and their use particularly as dyes for acrylic polymer textile materials.

The fluorindine compounds include those having the general formula wherein each R represents the same or a different lower alkyl or substituted lower alkyl group and X and Y each represent an ortho-phenylene, 1,2-naphthylene, or 2,3-naphthylene group.

The fluorindine compounds in which the R groups are the same are prepared as described by the examples below, by heating at about 120° C. to 250° C. at least one o-phenylenediamine or o-naphthalenediamine with 2,5-dihydroxy-1,4-benzoquinone in the presence of acid catalyst and preferably in relatively high boiling solvents such as glycol, a pyridine, quinoline, lower alkyl pyridine or lower alkyl quinoline solvents such as pyridine, 3-picoline, quinoline or quinaldine. When the reaction is carried out under pressure, water and lower boiling solvents, e.g. alcohols and aromatic solvents such as benzene and toluene can be used. As a result, improved purity of product and yield at lower cost are obtainable compared to known methods for preparing the fluorindines. Using prior methods very poor yields, not in excess of 10%, are obtained.

The reaction is illustrated as follows:

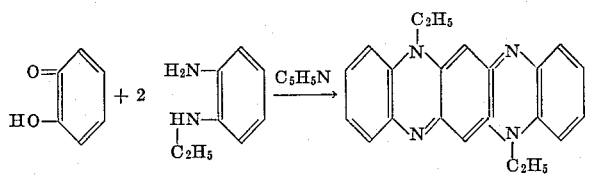

Approximately two moles of the amine are used per mole of the quinone.

In the process described using two moles of the same o-phenylenediamine a symmetrical 5,12-dialkylfluorindine is obtained. When two different o-phenylenediamines are used in the reaction as described in Example 17 below, a mixture of symmetrical and unsymmetrical 5,12-disubstituted fluorindines is obtained in which the groups in the 5 and 12-positions are the same or different. However, it may be difficult to separate the symmetrical and unsymmetrical components of the reaction mixture. Accordingly, when preparing the unsymmetrical 5,12-disubstituted fluorindines of the above general formula where the R groups are different, it is preferred to use the following process utilizing an N-alkyl-3-hydroxy-2-phenazinone:

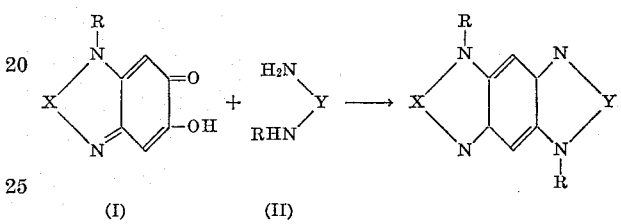

in which the two R groups of the reactants I and II are different alkyl or substituted alkyl groups.

The process may be carried out as described above and illustrated in the examples below, by heating in the presence of the solvents such as pyridine or quinoline compounds. However, the latter compounds are not required as shown by Example 18(c) below. The process, of course, can be used to make symmetrical compounds by using reactants in which the R groups are the same.

A group of the fluorindine compounds having the above formula, in which the R groups in the 5 and 12 positions represent lower alkyl or substituted lower alkyl, are especially useful as dyes for acrylic polymer textile materials. The compounds of the above formula in which R is hydrogen are capable of dyeing acrylic polymer fibers. However, they possess poor fastness properties, especially to washing under alkaline conditions and to alkaline perspiration. Also, in the presence of alkali, they behave as indicators and change color. The fluorindine compounds of the above formulas in which R is an aromatic group such as phenyl, have poor dyeing properties, e.g. poor affinity for acrylic textile fibers. The mentioned 5,12-dialkylfluorindines does not possess these disadvantages.

The o-phenylenediamines and o-naphthalenediamines useful in preparing the fluorindines include N-alkyl substituted o-phenylenediamine, such as N-methyl-o-phenylenediamine, N-ethyl-o-phenylenediamine, N-butyl-o-phenylenediamine, N-isopropyl-o-phenylenediamine, 3-amino-4-methylaminobenzotrifluoride, 4-nitro - 1 - N - methyl - o-phenylenediamine, N - (β - cyanoethyl) - o - phenylenediamine, N - (β - hydroxyethyl) - o - phenylenediamine, 2 - aminodiphenylamine, 1,2 - naphthalenediamine, 2,3-naphthalenediamine, 6 - nitro - 2,3 - naphthalenediamine, 2 - amino - 3 - methylaminonaphthalene, 2 - amino - 3-ethylaminonaphthalene, 2 - amino - 3 - propylaminonaphthalene and 2 - amino - 3 - ethyl - 6 - methoxyaminonaphthalene.

As mentioned above, the 5,12-dialkyl and 5,12-substituted dialkyl fluorindine compounds have outstanding utility as dyes for acrylic polymers having especially good affinity for polyacrylonitrile and modified polyacrylonitrile textile materials. On these materials they yield blue and green dyeings having good fastness, for example, to light, washing, perspiration, gas (atmospheric fumes), and sublimation. These dialkyl fluorindines can also be expected to respond favorably to other tests on textile dyes when tested by methods such as described in the A.A.T.C.C. Technical Manual, 1964 edition. The degree of utility varies, for example, depending upon the textile material being dyed and the formula of the particular fluorindine in use. Thus, all of the dialkylfluorindine compounds will not have the same degree of utility for the same textile material. For use in dyeing the acrylic textile materials, the compounds should be free of groups such as carboxyl and sulfo to the extent that they render the dye compounds water susceptible. As can be seen from the following examples, the substituents attached to the alkyl groups R of the above formula, and to the phenylene and naphthylene groups represented by X and Y can be varied widely and function primarily as auxochrome groups to control the color of the fluorindine compounds. Accordingly, the substituted alkyl group represented by R includes hydroxyalkyl, e.g. hydroxyethyl; polyhydroxyalkyl, e.g. 2,3-dihydroxypropyl [—$CH_2CH(OH)CH_2OH$]; alkoxyalkyl, e.g. methoxyethyl; cyanoalkyl, e.g. β-cyanoethyl; cyanoalkoxyalkyl, e.g. β-cyanoethoxyethyl, alkanoyloxy, e.g. acetoxyethyl; carboalkoxyalkyl, e.g. carbethoxyethyl; halogenoalkyl, e.g. chloroethyl; hydroxyhalogenoalkyl, e.g. β-hydroxy-γ-chloropropyl; alkylsulfonylalkyl, e.g. methylsulfonylethyl; alkyl—$OCOOCH_2CH_2$—, e.g. $CH_3OCOOCH_2CH_2$—; carbamoylalkyl, e.g. carbamoylethyl, benzyl, phenoxyalkyl, e.g. β-phenoxyethyl; sulfamoylalkyl; alkylsulfamoylalkyl, e.g. N-methylsulfamoylethyl; alkylcarbonamidoalkyl, e.g. ethylcarbonamidoethyl; dicarboxamidoalkyl, e.g. β-dicarboxamidoethyl, etc. Substituents on the phenylene and naphthylene groups represented by X and Y include alkyl e.g. methyl, alkoxy e.g. methoxy, nitro, amino, cyano, halogen, alkylsulfonyl e.g. methylsulfonyl, alkylsulfonamido e.g. methylsulfonamido, alkanoylamido e.g. acetamido, alkylthio e.g. methylthio, carbamoyl, etc.

Textile materials dyed by the fluorindine compounds, especially the above 5,12-alkyl and substituted alkyl fluorindines, are characterized by containing at least about 35% combined acrylonitrile units and up to about 95% acrylonitrile units, and modified, for example, by 85–5% of vinyl pyridine units as described in U.S. Pats. 2,990,393 (Re. 25,533) and 3,014,008 (Re. 25,539) or modified by 65–5% of vinylpyrrolidone units, for example, as described by U.S. Pats. 2,970,783, or modified with 65–5% acrylic ester or acrylamide units as described in U.S. Pats. 2,879,253, 2,879,254 and 2,838,470. Similar amounts of the other polymeric modifiers mentioned above are also useful. A preferred group of the copolymers readily dyeable with the fluorindines are the modacrylic polymers such as described in U.S. Pat. 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula

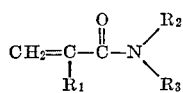

wherein $R_1$ is selected from the group consisting of hydrogen and methyl, and $R_2$ and $R_3$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

A particularly efficacious group of modacrylic polymers is an acetone soluble mixture of (A) 70–95% by weight of a copolymer of 30–65% by weight of vinylidene chloride and 70–35% by weight of acrylonitrile and (B) 30–5% by weight of an acrylamide homopolymer having the above formula wherein $R_1$, $R_2$ and $R_3$ are as described above. Specific polymers of that group contain 70–95% by weight of (A) a copolymer of from 30–65% by weight of vinylidene chloride and 70–35% by weight of acrylonitrile and (B) 30–5% by weight of a lower N-alkylacrylamide polymer such as poly-N-methacrylamide, poly-N-isopropylacrylamide and poly-N-tertiarybutylacrylamide.

The following example illustrates one way in which the fluorindine compounds of the invention can be used to dye acrylonitrile polymer textile material. .1 gram of dye is dissolved by warming in 5 cc. of methyl Cellosolve. A 2% aqueous solution of a non-ionic surfactant, such as Igepal CA (a polymerized ethylene oxide-alkylphenol condensation product), is added slowly until a fine emulsion is obtained and then the dye mixture is brought to a volume of 200 cc. with warm water. 5 cc. of a 5% aqueous solution of formic acid or acetic acid are added and then 10 grams of fabric made from an acrylic fiber is entered and in the case of Orlon 42 the dyeing is carried out at the boil for one hour. In the mase of materials should not exceed 90° C. in order to avoid damage to the fiber. The dyed material is then washed well with water and dried.

The following examples will serve to illustrate the synthesis and use of the fluorindine compounds.

EXAMPLE 1.—5,12-dihydro-5,12-dimethylquinoxalo [2,3-b]phenazine (5,12-dimethylfluorindine)

43 g. (0.22 mole) N-methyl-o-phenylenediamine dihydrochloride and 14 g. (0.1 mole) of 2,5-dihydroxy-1,4-benzoquinone dissolved in 150 ml. of pyridine were heated to a boil and refluxed with stirring for 17 hours. The reaction mixture was then cooled and filtered. The precipitate was washed with hot water, then with acetone and air-dried. The product was a dark powder, soluble in methanol and dilute mineral acids with a clear blue color. The acid solutions give a typical ruby-red fluorescence in ultraviolet light. The product dyes acrylic fibers in bright blue shades with excellent fastness properties. If 3-picoline is used as a solvent instead of pyridine, the reaction is complete after refluxing three hours. The dye is identical in all respects to that made in pyridine. When the process is carried out in absence of pyridine, yields as low as 10% are obtained.

EXAMPLE 2.—5,12-diethyl-5,12-dihydroquinoxalo [2,3-b]phenazine 18 g. N-ethyl-o-phenylenediamine dihydrochloride and 5.6 g. of 2,5-dihydroxy-1,4-benzoquinone in 75 ml. of pyridine were refluxed, with good agitation for 24 hours. The reaction mixture was then cooled and filtered. The precipitate was washed with warm water until the filtrate came through a clear blue. It was then washed with acetone and air-dried. Yield—15 g. of black crystalline powder which gave a bright blue solution in dilute mineral acids and in methanol. The product imparts fast blue shades of Orlon and Verel.

EXAMPLE 3.—5,12-dihydro-5,12-diisopropylquinoxalo [2,3-b]phenazine 10 g. N-isopropyl-o-phenylenediamine hydrochloride and 2.8 g. 2,3-dihydroxy-1,4-benzoquinone in 40 ml. of pyridine was heated to boiling and stirred at reflux for 60 hours. The reaction mixture was then cooled and filtered. The precipitate was thoroughly washed with water and then dissolved in warm very dilute acetic acid and filtered. The filtrate was made just basic with aqueous ammonia and the precipitated product was filtered off and washed with water. The product was a dark powder which dyed acrylic fibers in fast blue shades.

EXAMPLE 4.—5,12-dihydro-2,5,9,12-tetramethylquinoxalo[2,3-b]-phenazine 4.2 g. of 4-N-methyl-3,4-toluenediamine dihydrochloride and 1.4 g. of 2,5-dihydroxy-1,4-benzoquinone in 30 ml. of pyridine were refluxed with stirring for 20 hours. The reaction mixture was cooled and filtered. The precipitate was washed with water and dissolved in warm very dilute acetic acid. The solution was filtered and the filtrate neutralized with aqueous ammonia. The precipitate was filtered off, washed with water and dried at 60° C. The product dyed acrylic fibers blue shades wtih excellent fastness properties.

EXAMPLE 5.—5-12-dimethyl-3,10-bis(trifluoromethyl)-5,12-dihydroquinoxalo[2,3-b]phenazine 5.5 g. 1-N-methylamino-4-trifluoromethyl-o-phenylenediamine hydrochloride and 1.4 g. 2,5-dihydroxy benzoquinone in 40 ml. pyridine were refluxed with stirring for 42 hours. The reaction mixture was then cooled and filtered. The precipitate was washed thoroughly with hot water, then with methyl alcohol and finally with acetone. The product dyed acrylic fibers fast blue shades with excellent fastness to light and wishing.

EXAMPLE 6.—2,9-dibromo-5,12-dihydro-5,12-dimethylquinoxalo[2,3-b]-phenazine 3.12 g. 5,12-dihydro-5,12-dimethylquinoxalophenazine was dissolved in 100 ml. glacial acetic acid. A solution of 3.2 g. of bromine in 50 ml. of glacial acetic acid was added over a period of 15 minutes. The solution was stirred at room temperature for two hours, then the temperature was raised to gentle reflux over 1.5 hours. The reaction mixture was then drowned in a large excess of water and neutralized with aqueous ammonia. The poduct was filtered off, washed with water and dried at 60° C. The product dyes acrylic fibers in fast blue shades.

EXAMPLE 7.—5,12 - dimethyl-2,9-dinitro-5,12-dihydroquinoxalo[2,3-b]-phenazine 4.4 g. 4-nitro-1-N-methyl-o-phenylenediamine hydrochloride and 1.26 g. 2,5-dihydroxy-1,4-benzoquinone in 25 ml. pyridine were heated to reflux and refluxed 60 hours. The reaction mixture was then cooled and filtered. The precipitate was washed with hot water, methanol and then acetone. The product dyes acrylic fibers dull blue shades.

EXAMPLE 8.—2,9-diamino-5,12-dimethyl-5,12-dihydroquinoxalo[2,3-b]-phenazine 4.02 g. 5,12 - dimethyl - 2,9-dinitro-5,12 - dihydroquinoxalo[2,3-b]phenazine slurried in 150 ml. of water and added a solution of 35 g. of sodium sulfide monohydrate in 100 ml. of water. Heated on a steam bath with stirring for four hours. The reaction mixture was then cooled and filtered. The precipitate was washed with water and dried at 60° C. The product dyed acrylic fibers blue shades.

EXAMPLE 9.—5,12-di(β-cyanoethyl)5,12-dihydroquinoxalo[2,3-b]-phenazine 2.34 g. N-(β-cyanoethyl)-o-phenylenediamine hydrochloride and 0.7 g. 2,5-dihydroxy-1,4-benzoquinone in 15 ml. of pyridine were stirred at gentle reflux for 30 hours. The reaction mixture was then cooled and filtered. The precipitate was washed with hot water, then methanol and then acetone. The product was a black solid which dissolved in concentrated sulfuric acid with a blue-green color. It dyed acrylic fibers blue shades.

EXAMPLE 10.—5,12-di(β-hydroxyethyl)-2,5-dihydroquinoxalo[2,3-b]-phenazine 2.3 g. N-(β-hydroxyethyl)-o-phenylenediamine dihydrochloride and 0.7 g. 2,5-dihydroxy-1,4-benzoquinone in 15 ml. of pyridine were stirred at gentle reflux for 30 hours. The reaction mixture was then cooled and filtered. The precipitate was washed successively with water, methanol and acetone and air-dried. The product dyed acrylic fibers in fast blue shades.

EXAMPLE 11.—5,12-dihydro-5,12-dihyenylquinoxalo[2,3-b]phenazine 5.14 g. 2-aminodiphenylamine dihydrochloride and 1.4 g. 2,5-dihydroxy-1,4-benzoquinone in 25 ml. of pyridine were refluxed with stirring for 18 hours. The reaction mixture was then cooled and filtered. The precipitate was washed with hot water and dried at 60° C. The product dyed acrylic fibers blue shades but the affinity was not as good as that of the above 5,12-dialkylfluorindines. The yield of product was about 50%; in absence of pyridine the process gives yields of only about 10%.

EXAMPLE 12.—5,12-dihydro-5,12-dibutylquinoxalo[2,3-b]phenazine

A solution of 38 g. (.012 mole) of N-butyl-o-phenylenediamine dihydrochloride and 8.4 g. (0.06 mole) of 2,5-dihydroxybenzoquinone in 100 ml. of 3-picoline was heated to a boil and refluxed with stirring for three hours. The reaction mixture was cooled and filtered. The precipitate was thoroughly washed with water and then with 50 ml. of a 3% sodium hydroxide solution. It was then washed with warm water until the filtrate was alkali free. Yield was 25 g. of a dark powder which imparts fast blue shades to acrylic fibers.

EXAMPLE 13.—5,12-diethyl-2,9-bis(sulfamoyl)-5,12-dihydroquinoxalo[2,3-b]phenazine 6.5 g. of 4-N-ethyl-3,4-diaminobenzenesulfonamide, 2.1 g. of 2,5-dihydroxybenzoquinone and 12 ml. of hydrochloric acid (37% HCl) in 35 ml. of 3-picoline were refluxed with stirring for seven hours. Any water present or formed was distilled off during the reaction. The reaction mixture was cooled and filtered. The precipitate was thoroughly washed with water, then ethanol and dried at 60° C. Yield was 7.5 g. of a dark powder which imparts fast blue shades to Orlon and Verel acrylic fibers.

EXAMPLE 14.—2,9-dimethoxy-5,12-diethyl fluorindine

The N-butyl-o-phenylenediamine dihydrochloride of Example 12 was replaced by 27.76 g. of 4-N-ethyl-3,4-diaminoanisole and a dyestuff of a more greenish-blue shade was obtained with analogous tinctorial properties.

EXAMPLE 15.—5,12-dimethyl-dibenzo[b,m]fluorindine

Forty-nine grams of 2-amino-3-methylaminonaphthalene dihydrochloride and 14 g. of 2,5-dihydroxybenzoquinone in 150 ml. of 3-picoline were refluxed with stirring for 3½ hours. The reaction mixture was then cooled and filtered and the pocket thoroughly washed with warm water. The precipitate was then washed with 3% sodium hydroxide until the filtrate came through colorless. It was then washed with water until alkali-free and dried at 60° C. The material dyes acrylic fibers fast blue shades.

EXAMPLE 16

The process of Example 1 is carried out except using 0.22 mole o-phenylenediamine hydrochloride to obtain the patent fluorindine compound unsubstituted in the 5,12-positions. The compound obtained in high yield dyes acrylic textile materials, but as mentioned previously, is characterized by poor fastness to alkaline washing conditions and alkaline perspiration. When the process is carried out in absence of pyridine, low yields of about 10% of theory are obtaind.

EXAMPLE 16a 8.6 g. (.05 mole) of N-ethyl-o-phenylenediamine, and 2.8 g. (.02 mole) of 2,5-dihydroxybenzoquinone are slurried in 50 ml. of ethylene glycol. 2.5 ml. of glacial acetic acid is added and the reaction mixture is heated to 175° C. It is stirred at 175 to 180° C. for 2.5 hours, then drowned in 800 ml. of water. The water slurry is made basic with dilute aqueous ammonia and filtered. The filter-cake is thoroughly washed with hot water, and the product is dried at 60° C. The material thus obtained is identical with the product of Example 2.

EXAMPLE 16b 15.76 g. (.075 mole) of N-ethyl-o-phenylenediamine dihydrochloride and 4.2 g. (.03 mole) of 2,5-dihydroxybenzoquinone in 200 ml. of water are heated at 175° C. in a stainless steel rocking autoclave for eight hours. The reaction mixture is then filtered and the filter-cake washed with water. The cake is slurried in water, the slurry made basic with aqueous ammonia and filtered. The filter-cake is thoroughly washed with hot water and dried at 60° C. The product is identical to that of Example 2.

The symmetrical fluorindine compounds described in the following table are prepared in the manner described in the above examples. The compounds have properties as dyes comparable to compounds of the above examples and produce blue shades on acrylic fibers. The compounds of the table have the formula:

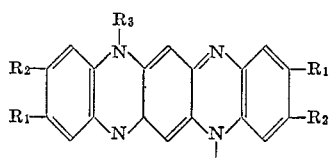

TABLE

| Example: | $R_1$ | $R_2$ | $R_3$ |
|---|---|---|---|
| 16c | —$SO_2CH_3$ | —H | —$C_2H_5$ |
| 16d | —Cl | —H | —$C_2H_5$ |
| 16e | —H | —$CF_3$ | —$C_2H_5$ |
| 16f | —Cl | —$CH_3$ | —$C_2H_5$ |
| 16g | —OH | —H | —$C_2H_5$ |
| 16h | —Cl | —H | —CH(CH$_3$)$_2$ |
| 16i | —H | —$CF_3$ | —CH(CH$_3$)$_2$ |
| 16j | —$SO_2NH_2$ | —H | —CH(CH$_3$)$_2$ |
| 16k | —$SO_2NHCH_3$ | —H | —$C_4H_9$ |
| 16l | —Cl | —Cl | —$C_4H_9$ |
| 16m | —$SO_2NH_2$ | —H | —$C_4H_9$ |

8.36 g. (.04 mole) of N-ethyl-o-phenylenediamine dihydrochloride, 7.8 g. (.04 mole) of N-methyl-o-phenylenediamine dihydrochloride and 5.6 g. (.04 mole) of 2,5-dihydroxybenzoquinone in 100 ml. of 3-picoline was stirred at 140° C. for three hours. Water generated during the reaction was distilled off as formed. The reaction mixture was then cooled and filtered. The precipitate was washed thoroughly with warm water, then with 3% sodium hydroxide. It was then washed with warm water until the filtrate came through a dark, clear blue. Yield was 87% of theory. Paper chromatography showed one main component with small amounts of two other blue components.

EXAMPLE 18.—Unsymmetrical 5-methyl-12-ethyl fluorindine (A) 10-ethyl-3-hydroxy-2-phenazinone 68 g. (0.5 mole) of N-ethyl-o-phenylenediamine and 70 g. (0.5 mole) of 2,5-dihydroxybenzoquinone are mixed in 1300 ml. of water and 100 ml. of concentrated hydrochloric acid. The mixture is heated to boiling and stirred at reflux temperature for one hour. The reaction mixture is then cooled to room temperature, made basic with 50% sodium hydroxide solution and filtered through a sintered glass funnel. The filtrate is neutralized with acetic acid and filtered. The filter cane is thoroughly washed with water and dried. Yield is quantitative M.P. 255-256° C.

(B) 4.8 g. of 10-ethyl-3-hydroxy-2-phenazinone and 4 g. of 1-N-4-dimethyl-o-phenylenediamine dihydrochloride are added to 25 g. of 3-picoline. The reaction mixture is heated to 140° C. and stirred to 130–140° for two hours removing water as formed. The reaction mixture is cooled and filtered. The precipitate is washed with water, then with dilute (5%) ammonia solution. The filter cake is then thoroughly washed with water and dried at 60° C. The product dyes acrylic fibers fast bright blue shades. The product has the formula:

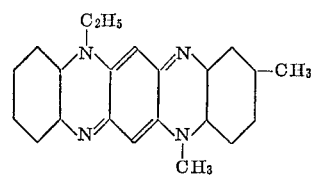

(C) 4.8 g. of 10-ethyl-3-hydroxy-2-phenazinone, 4 g. of 1-N-4-dimethyl-o-phenylenediamine dihydrochloride, and 100 ml. of water are heated at 175° C. in a stainless steel autoclave for eight hours. The reaction mixture is filtered and the precipitate washed with water. The product is then washed with dilute (5%) ammonia solution, then thoroughly washed with water and dried at 60° C. The product is identical to A.

The unsymmetrical fluoridine compounds shown in the following table were prepared by the methods described in Example 18 and possess comparable properties as dyes. The compounds have the formula:

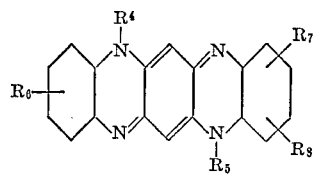

TABLE

| Example | R4 | R5 | R6 | R7 | R8 | Color on orlon |
|---|---|---|---|---|---|---|
| 19 | $-C_2H_5$ | $-CH_3$ | H | H | H | Blue. |
| 20 | $-C_2H_5$ | $-CH_3$ | H | 2—$CH_3$ | H | Do. |
| 21 | $-C_2H_5$ | $-CH(CH_3)_2$ | H | H | H | Do. |
| 22 | $-C_2H_5$ | $-C_4H_9$ | H | H | H | Do. |
| 23 | $-C_2H_5$ | $CH_3$ | H | 2—$NO_2$ | H | Reddish blue. |
| 24 | $-C_2H_5$ | $CH_3$ | H | 2—$SO_2NH_2$ | H | Do. |
| 25 | $-C_2H_5$ | $CH_3$ | H | 3—$SO_2NH_2$ | H | Do. |
| 26 | $-C_2H_5$ | $-CH_2CH_2OH$ | H | H | H | Blue. |
| 27 | $-C_2H_5$ | $-C_6H_5$ | H | H | H | Do. |
| 28 | $-C_2H_5$ | $-CH_3$ | H | 2—$SO_2CH_3$ | H | Reddish blue. |
| 29 | $-C_2H_5$ | $-CH_3$ | H | 1,2-benzo | | Blue. |
| 30 | $-C_2H_5$ | $-CH_3$ | H | 2,3-benzo | | Do. |
| 31 | $-CH_3$ | $-C_4H_9$ | $CH_3$ | H | H | Do. |
| 32 | $-CH_3$ | $-CH(CH_3)_2$ | 9—$SO_2NH_2$ | H | H | Reddish blue. |
| 33 | $-CH_3$ | $-C_2H_5$ | 9—$CF_3$ | H | H | Do. |
| 34 | $-CH(CH_3)_2$ | $-CH_3$ | H | 2—$SO_2CH_3$ | H | Do. |
| 35 | Same as above | $-CH_3$ | H | 2—$NO_2$ | H | Do. |
| 36 | do | $-C_2H_5$ | 9—$CF_3$ | H | H | Do. |
| 37 | do | $-CH_2CH_2OH$ | H | H | H | Blue. |
| 38 | do | $-CH_2CH_2CH_2N(CH_3)_2$ | H | H | H | Do. |
| 39 | do | $-C_4H_9(n)$ | H | H | H | Do. |
| 40 | do | $-C_6H_5$ | H | H | H | Do. |
| 41 | $-C_4H_9$ | $-CH_3$ | H | H | H | Do. |
| 42 | $-C_4H_9$ | $-CH_2CH_2OH$ | H | H | H | Do. |
| 43 | $-C_4H_9$ | $-CH_2CH_2CH_2N(CH_3)_2$ | H | H | H | Do. |
| 44 | $-C_4H_9$ | $-CH_3$ | H | 2-$SO_2NH_2$ | H | Do. |
| 45 | $-C_4H_9$ | $-C_2H_5$ | H | 2-$CF_3$ | H | Reddish blue. |
| 46 | $-C_4H_9$ | $-CH_3$ | H | 3-$SO_2CH_3$ | H | Blue. |
| 47 | $-C_4H_9(n)$ | $-CH_3$ | H | 2-$NO_2$ | H | Reddish blue. |
| 48 | $-C_2H_5$ | $-CH_3$ | 9-$SO_2NH_2$ | 2-$CH_3$ | H | Do. |
| 49 | $-C_2H_5$ | $-CH_3$ | 9-$SO_2NH_2$ | H | H | Red blue. |
| 50 | $-C_2H_5$ | $-CH_3$ | 9-$SO_2NH_2$ | 2-$CF_3$ | H | Do. |
| 51 | $-C_2H_5$ | $-CH_2CH_2CH_2N(CH_3)_2$ | 9-$SO_2NH_2$ | H | H | Blue. |
| 52 | $-C_3H_7(n)$ | $-C_2H_5$ | H | 2-$CF_3$ | H | Reddish blue. |
| 53 | $-C_4H_9(iso)$ | $-C_2H_5$ | H | H | H | Blue. |
| 54 | $-C_2H_5$ | $-CH_3$ | H | 2-$NH_2$ | H | Do. |
| 55 | $-C_2H_5$ | $-CH_3$ | H | 2-$OCH_3$ | H | Green blue. |
| 56 | $-C_4H_9$ | $-CH_3$ | H | 2-$OCH_3$ | H | Blue. |
| 57 | $-CH_2CH_2CH_2N(CH_3)_2$ | $-CH_3$ | H | 2-$CH_3$ | H | Do. |
| 58 | $-C_2H_5$ | $-CH_3$ | H | 2-$NH_2$ | 3-Cl | Do. |
| 59 | $-C_2H_5$ | $-CH_3$ | H | 2-$OCH_3$ | 3-Cl | Do. |

The invention has been described in considerable detail with particular reference to certain preferred embodiment thereof, but it will be understood that variations and modifications can be effected within the spirit and scope of the invention as described hereinabove, and as defined in the appended claims.

What we claim is:
1. A compound having the formula

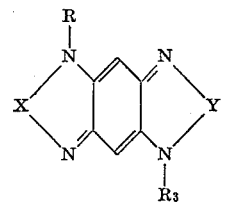

wherein
R and $R_3$ are the same or different and each represents lower alkyl or lower alkyl substituted with hydroxy, lower alkoxy, cyano, [lower cyanoalkoxy] lower alkanoyloxy, lower carbalkoxy, halogen, [lower alkylsulfonyl] carbamoyl, [lower alkylcarbamoyl, phenyl, phenoxy, sulfamoly, lower alkylsulfamoyl] or lower dialkylamino; and X and Y are the same or different and each represents ortho-phenylene; ortho-phenylene substituted with lower alkyl, lower alkoxy, nitro, amino, cyano, halogen, lower alkylsulfonyl, lower alkanoylamido, lower alkylthio, carbamoyl, sulfamoyl, lower alkylsulfamoyl, or trifluoromethyl; 1,2-napthylene; or 2,3-napthylene.

2. A compound having the formula

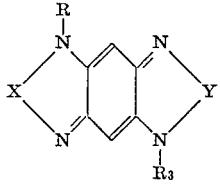

wherein
R and $R_3$ each represent lower alkyl and
X and Y are the same or different and each represents ortho-phenylene; ortho-phenylene substituted with lower alkyl, lower alkoxy, halogen, sulfamoyl, lower alkylsulfamoyl, lower alkyl-sulfonyl, nitro, or trifluoromethyl; 1,2-naphthylene; or 2,3-naphthylene.

3. A compound according to claim 1 wherein X and Y each represents ortho-phenylene or ortho-phenylene substituted with lower alkyl, lower alkoxy, or halogen.

4. 5,12-dimethylfluorindine.
5. 5,12-diethylfluorindine.
6, 5,12-dimethyl-3,10-bis(trifluoromethyl)fluorindine.
7. 2,5,9,12-tetramethylfluorindine.
8. 2,9-diamino-5,12-dimethylfluorindine.
9. 5,12-di($\beta$-hydroxyethyl)fluorindine.
10. 5,12-diethyl-2,9-bis(sulfamoyl)fluorindine.
11. 5,12-diethyl-2,9-dimethoxyfluorindine.
12. 5,12-diisopropylfluorindine.
13. 5-ethyl-12-n-butylfluorindine.
14. 12-ethyl-5-methyl-2-sulfamoyl fluorindine.
15. 14-ethyl-6-methylbenzo[1,2,a]fluorindine.
16. 5-butyl-9,12-dimethylfluorindine.
17. 5-ethyl-12-methyl-9-trifluoromethylfluorindine.
18. 12 - ethyl-5-methyl-9-sulfamoyl-2-trifluoromethylfluorindine.
19. 3-chloro-12-ethyl-2-methoxy-5-methylfluorindine.

References Cited

UNITED STATES PATENTS 3,390,948  7/1968  Straley et al. _____ 260—267

OTHER REFERENCES

Berichte. Kehrmann: Zur Constitution der Fluorindine und Rosinduline, 27, 1894, p. 3348 relied on.

Kehrmann et al., Relv. Chim. Acta., vol. 8 (1925) pp. 5–8.

ALEX MAZEL, Primary Examiner

A. T. TIGHE, Assistant Examiner

U.S. Cl. X.R.

8—177; 260—41

PO-1050
(5/69)

UNITED STATES PATENT OFFICE
CERTIFICATE OF CORRECTION

Patent No. ____3,534,040____  Dated ____October 13, 1970____

Inventor(s) ____James M. Straley and Raymond C. Harris____

It is certified that error appears in the above-identified patent and that said Letters Patent are hereby corrected as shown below:

Column 1, lines 55 through 64, the formula should read:

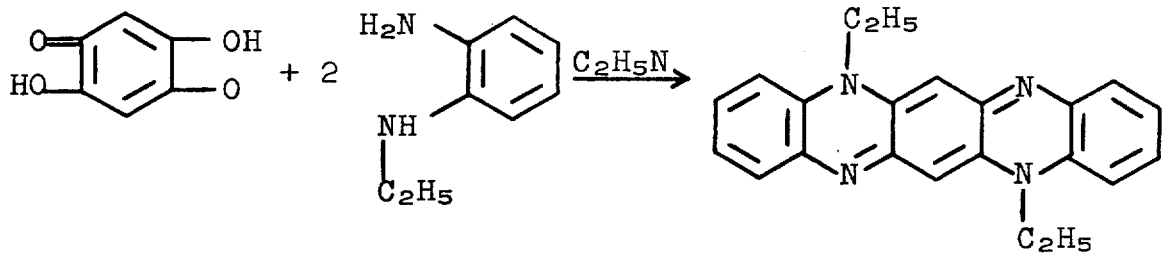

5,12-diethylfluorindine

Column 2, lines 15 through 30, the formula should read:

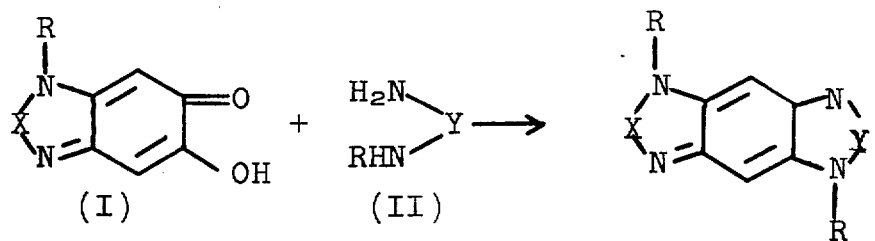

Column 3, line 31, cancel "alkanoyl-" and line 32, cancel "oxy" and insert ---alkanoyloxyalkyl---.

Column 3, line 39, cancel "ethylcarbonamidoethyl" and insert ---ethylcarbamoylethyl---.

Column 4, line 33, cancel "mase" and insert ---case---.

PO-1050
(5/69)

UNITED STATES PATENT OFFICE
CERTIFICATE OF CORRECTION

Patent No. __3,534,040__ Dated __October 13, 1970__

Inventor(s) __James M. Straley and Raymond C. Harris__ PAGE - 2

It is certified that error appears in the above-identified patent and that said Letters Patent are hereby corrected as shown below:

Column 4, line 34, before the word "should", insert ---made of Verel acrylic fiber the dyebath temperature---.

Column 4, line 74, cancel "2,3-dihydroxy-1,4-benzoquinone" and insert ---2,5-dihydroxy-1,4-benzoquinone---.

Column 5, line 31, cancel "wishing" and insert ---washing---.

Column 5, line 42, cancel "pod-" and insert ---prod- ---.

Column 6, line 11, cancel "5,12-dihydro-5,12-dihyenylquinoxalo" and insert ---5,12-dihydro-5,12-diphenylquinoxalo---.

Column 6, line 69, cancel "patent" and insert ---parent---.

Column 7, lines 30 through 43, the formula should read:

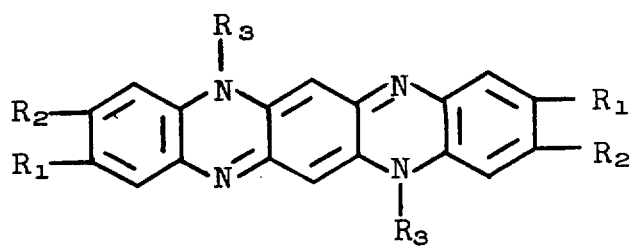

Column 7, on approximately lines 70 and 71, after the Table, insert ---Example 17--Unsymmetrical 5,12-dialkylfluorindine---.

Columns 9 and 10, Example 49, in the Table under the heading "$R_7$", cancel "H" and insert ---2-$NO_2$---.

Column 11, line 3, Claim 1, cancel "[lower cyanoalkoxy]".

UNITED STATES PATENT OFFICE
CERTIFICATE OF CORRECTION

PO-1050 (5/69)

Patent No. 3,534,040     Dated October 13, 1970

Inventor(s) James M. Straley and Raymond C. Harris    PAGE - 3

It is certified that error appears in the above-identified patent and that said Letters Patent are hereby corrected as shown below:

Column 11, line 5, Claim 1, cancel "[lower alkyl-".

Column 11, line 6, Claim 1, cancel "sulfonyl]" and "[lower alkylcarbamoyl, phenyl,".

Column 11, line 7, Claim 1, cancel "phenoxy, sulfamoly, lower alkylsulfamoyl]".

SIGNED AND SEALED
MAR 9 1971

(SEAL)
Attest:
Edward M. Fletcher, Jr.
Attesting Officer

WILLIAM E. SCHUYLER, JR.
Commissioner of Patents